Figure 1:
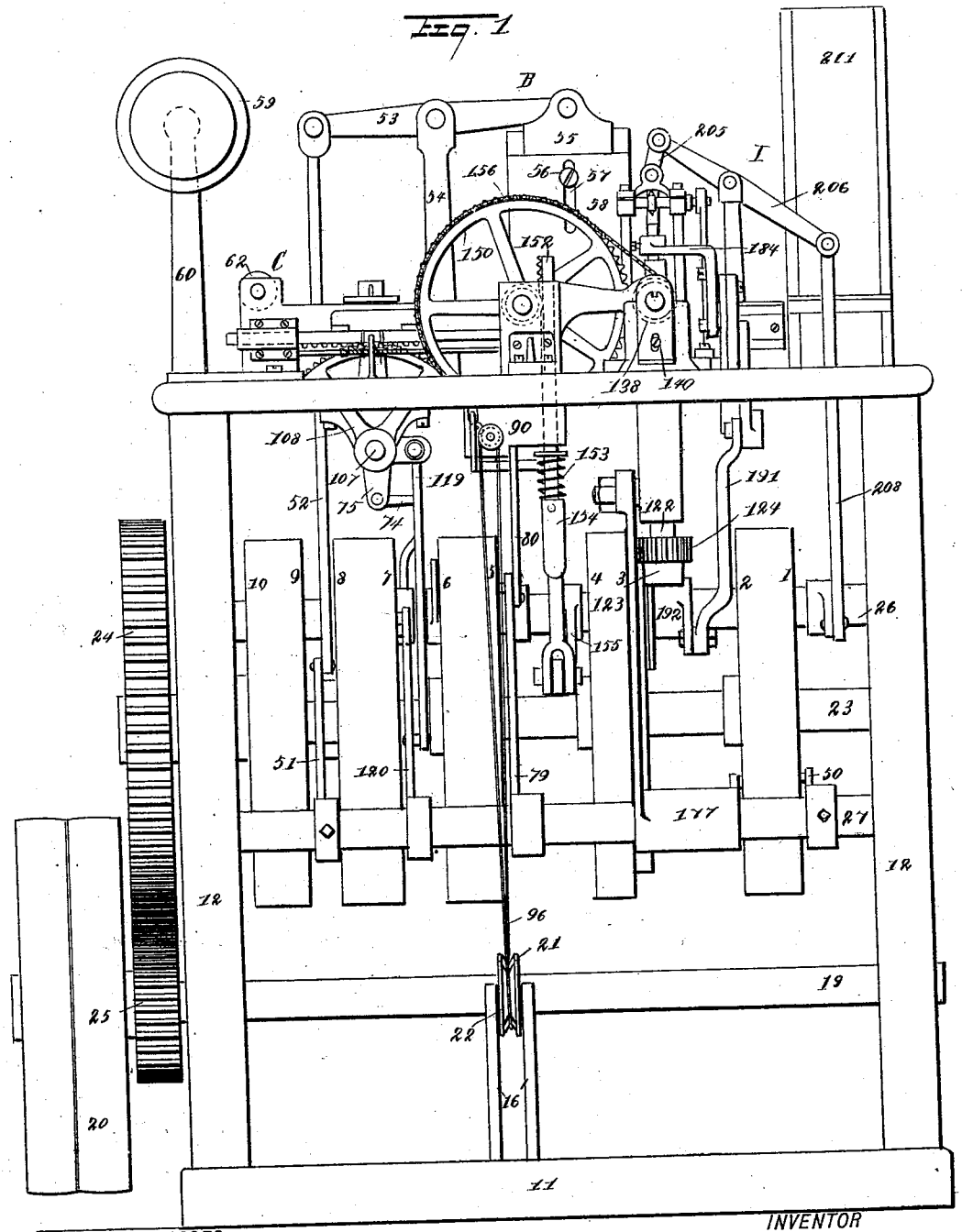

(No Model.) 11 Sheets—Sheet 3.

DOMINGO PEREZ Y BUÑOL.
CIGARETTE MACHINE.

No. 547,709. Patented Oct. 8, 1895.

WITNESSES:
H. Walker
John Lotka

INVENTOR
D. Perez y Buñol
BY
Munn & Co
ATTORNEYS.

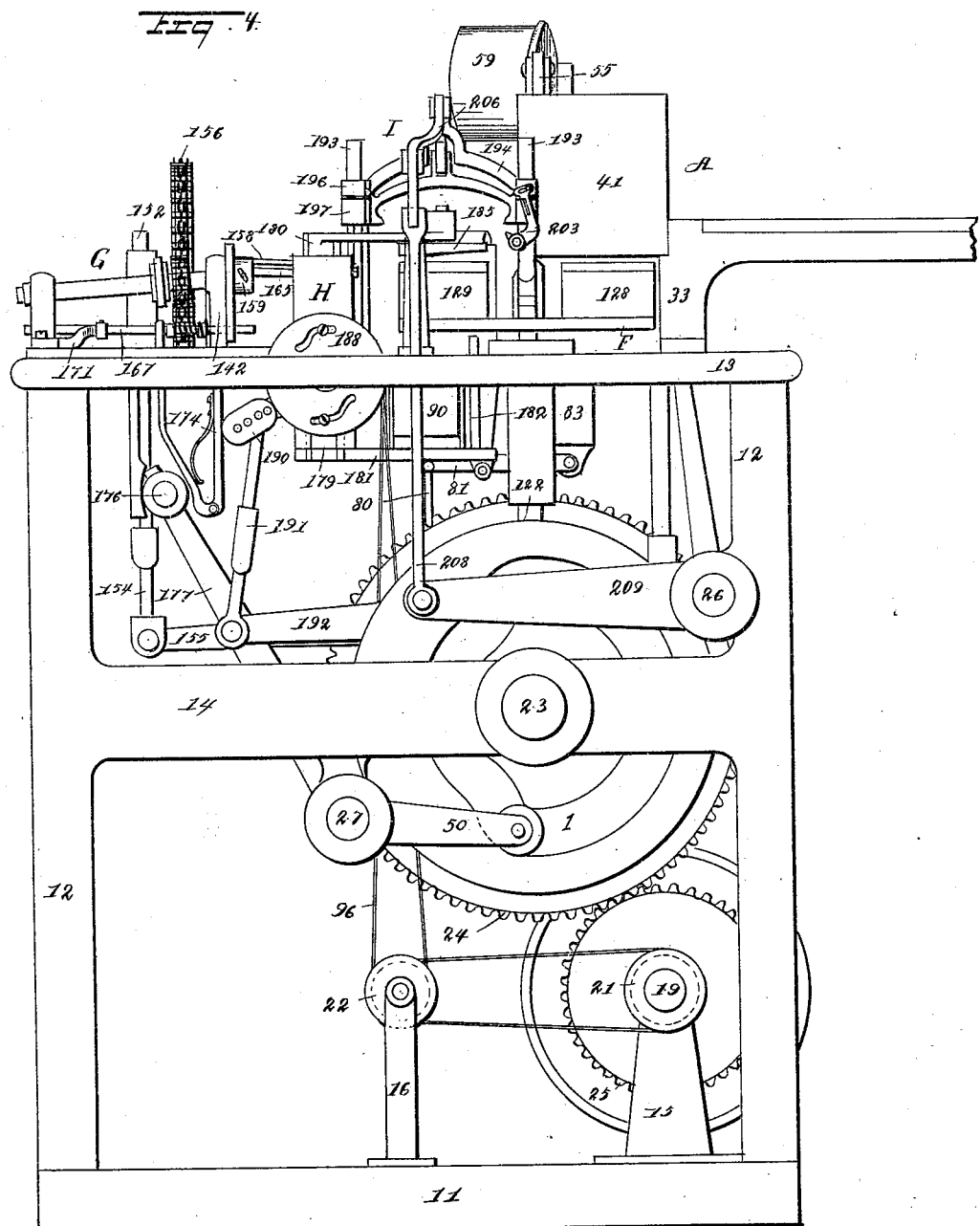

(No Model.) 11 Sheets—Sheet 5.
DOMINGO PEREZ Y BUÑOL.
CIGARETTE MACHINE.
No. 547,709. Patented Oct. 8, 1895.
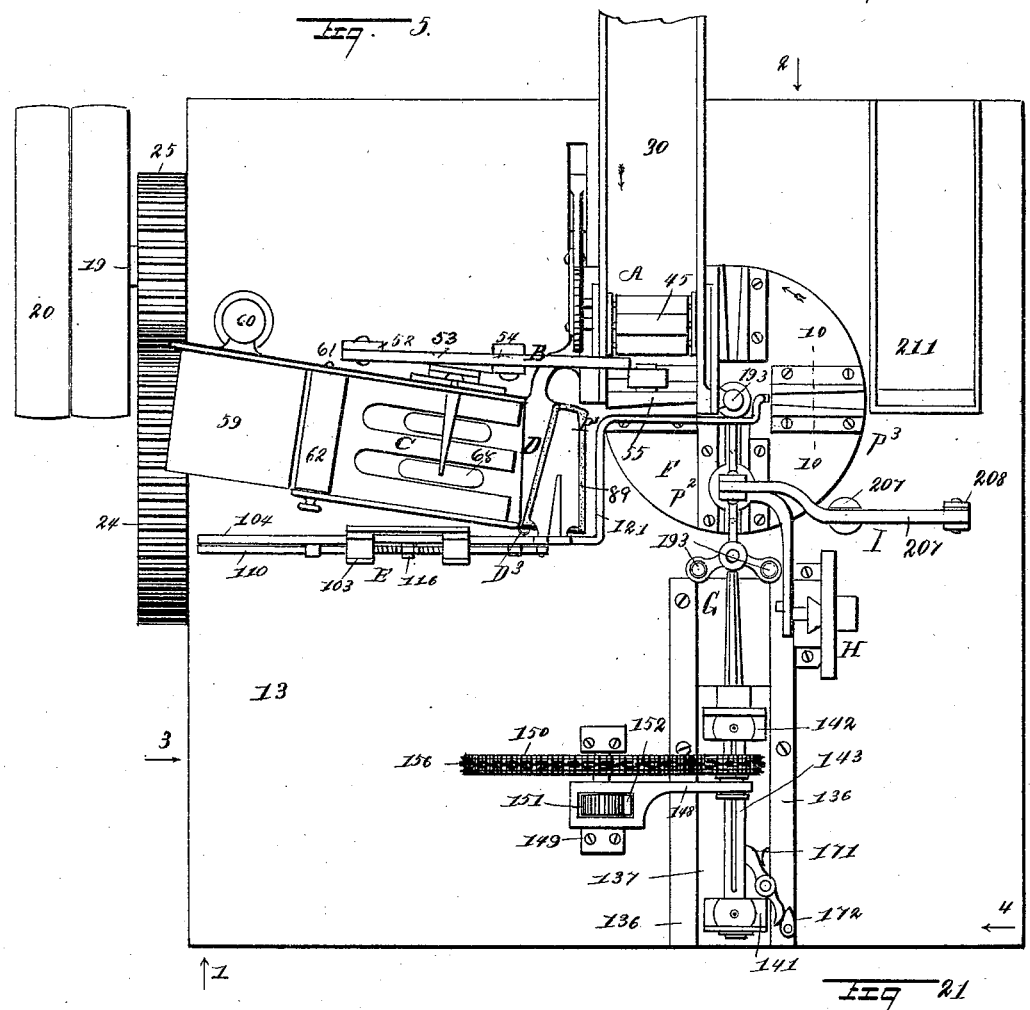

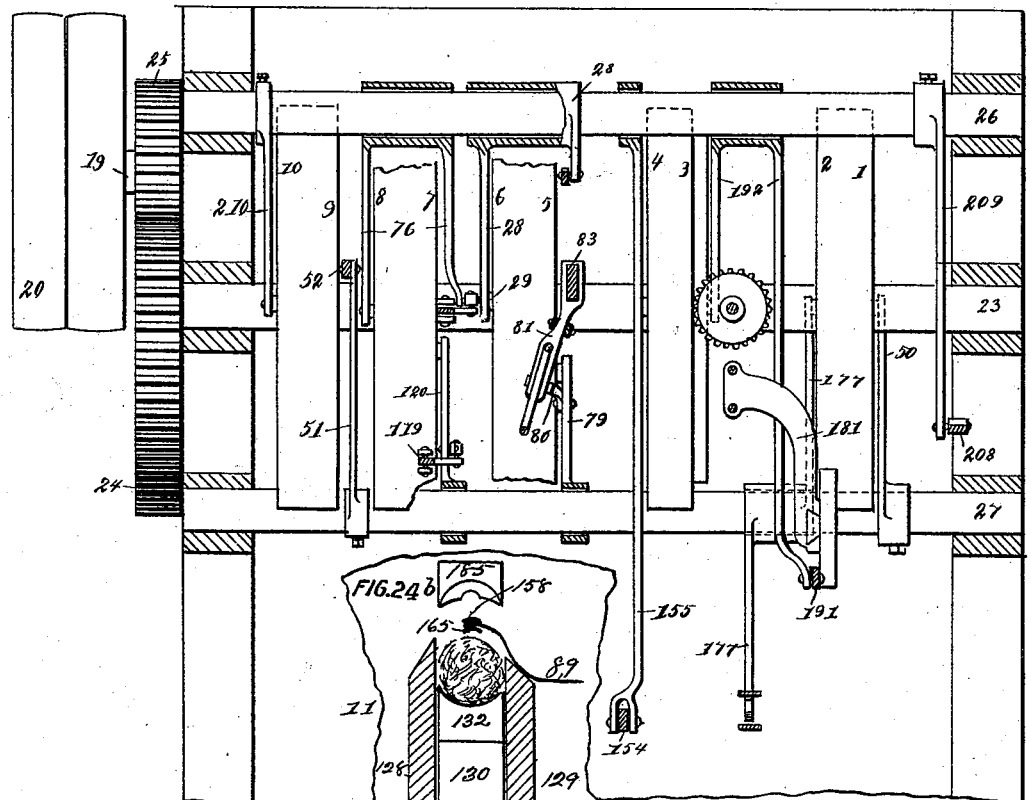

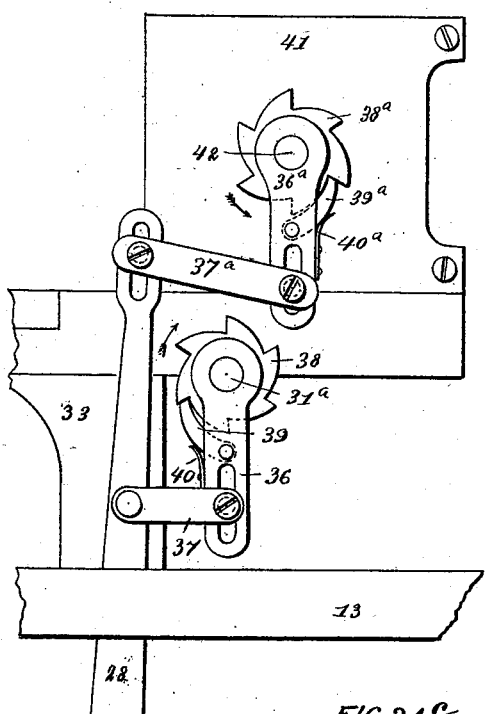

(No Model.) 11 Sheets—Sheet 8.
DOMINGO PEREZ Y BUÑOL.
CIGARETTE MACHINE.
No. 547,709. Patented Oct. 8, 1895.
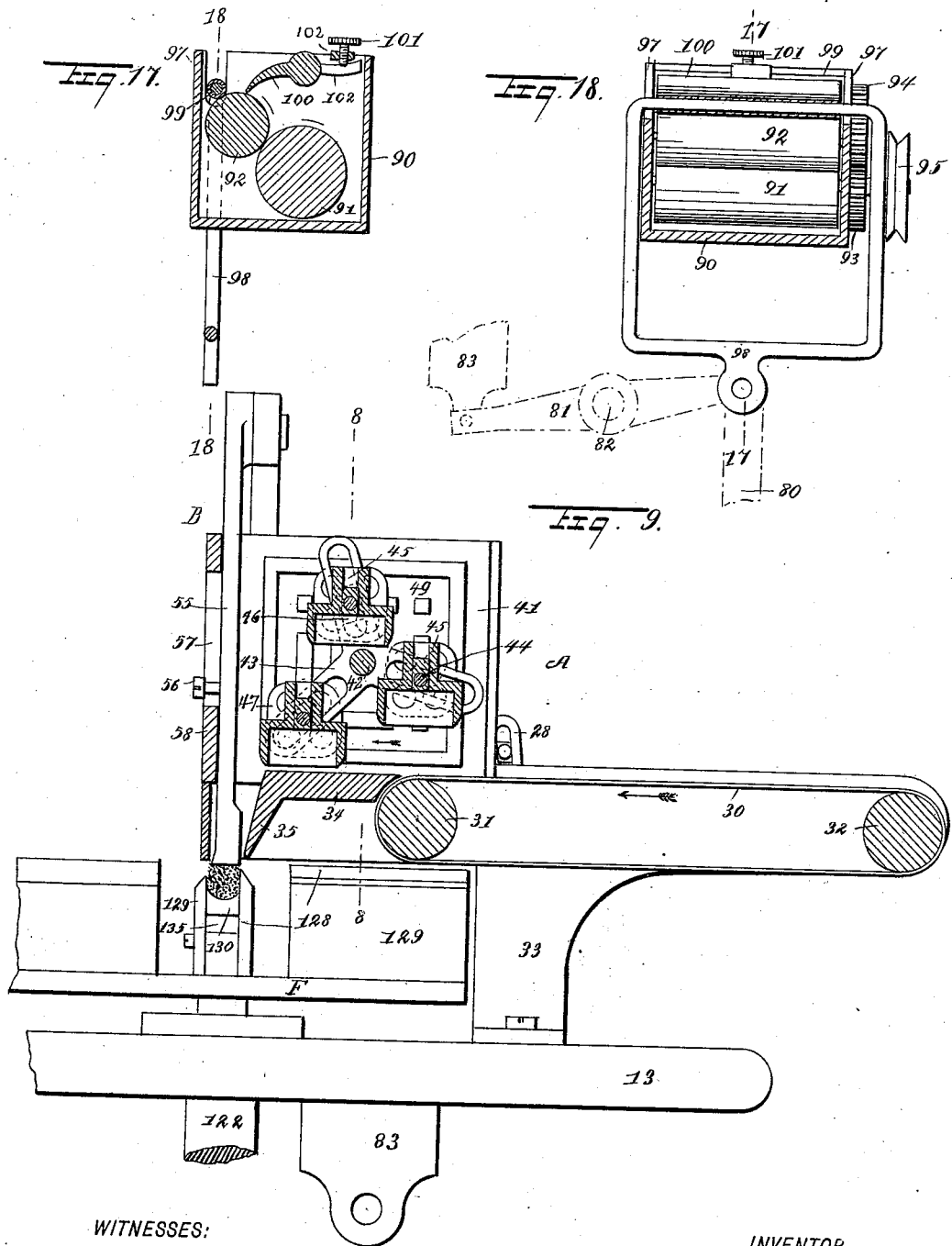
WITNESSES:
H. Walker
John Lotka
INVENTOR
D. Perez y Buñol
BY Munn & Co
ATTORNEYS.

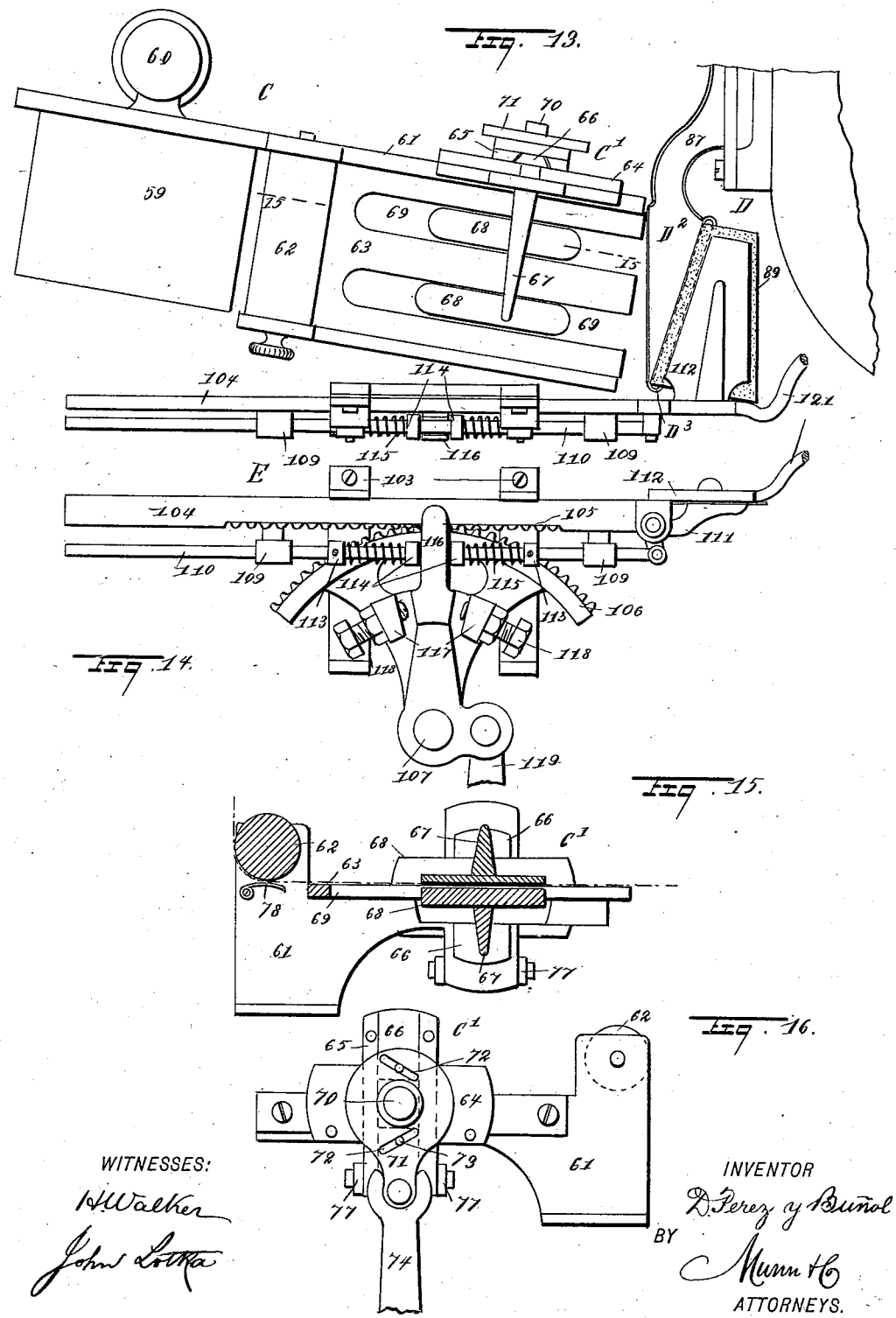

(No Model.) 11 Sheets—Sheet 10.
DOMINGO PEREZ Y BUÑOL.
CIGARETTE MACHINE.
No. 547,709. Patented Oct. 8, 1895.
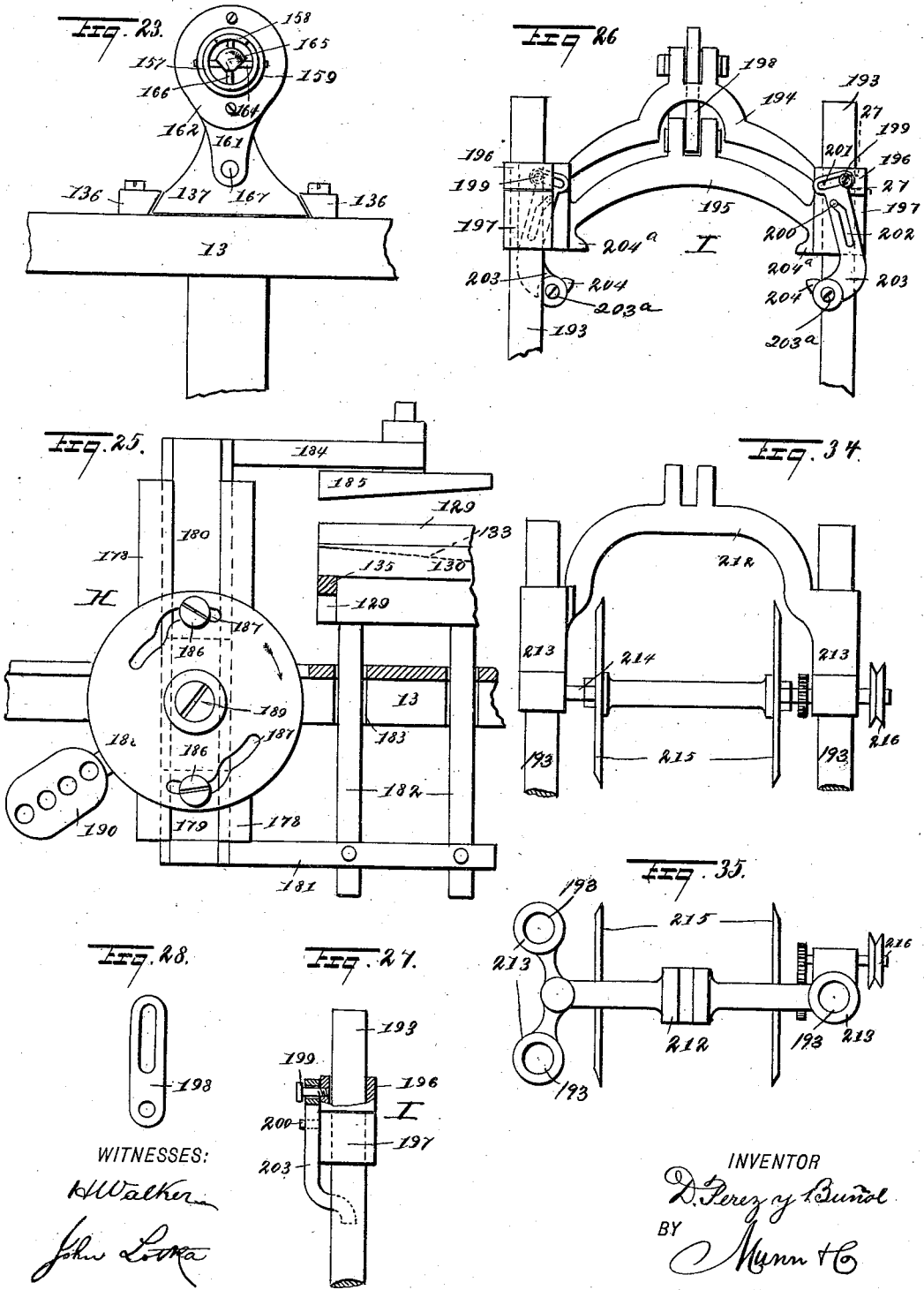
WITNESSES:
H. Walker
John Lotka
INVENTOR
D. Perez y Buñol
BY
Munn & Co
ATTORNEYS.

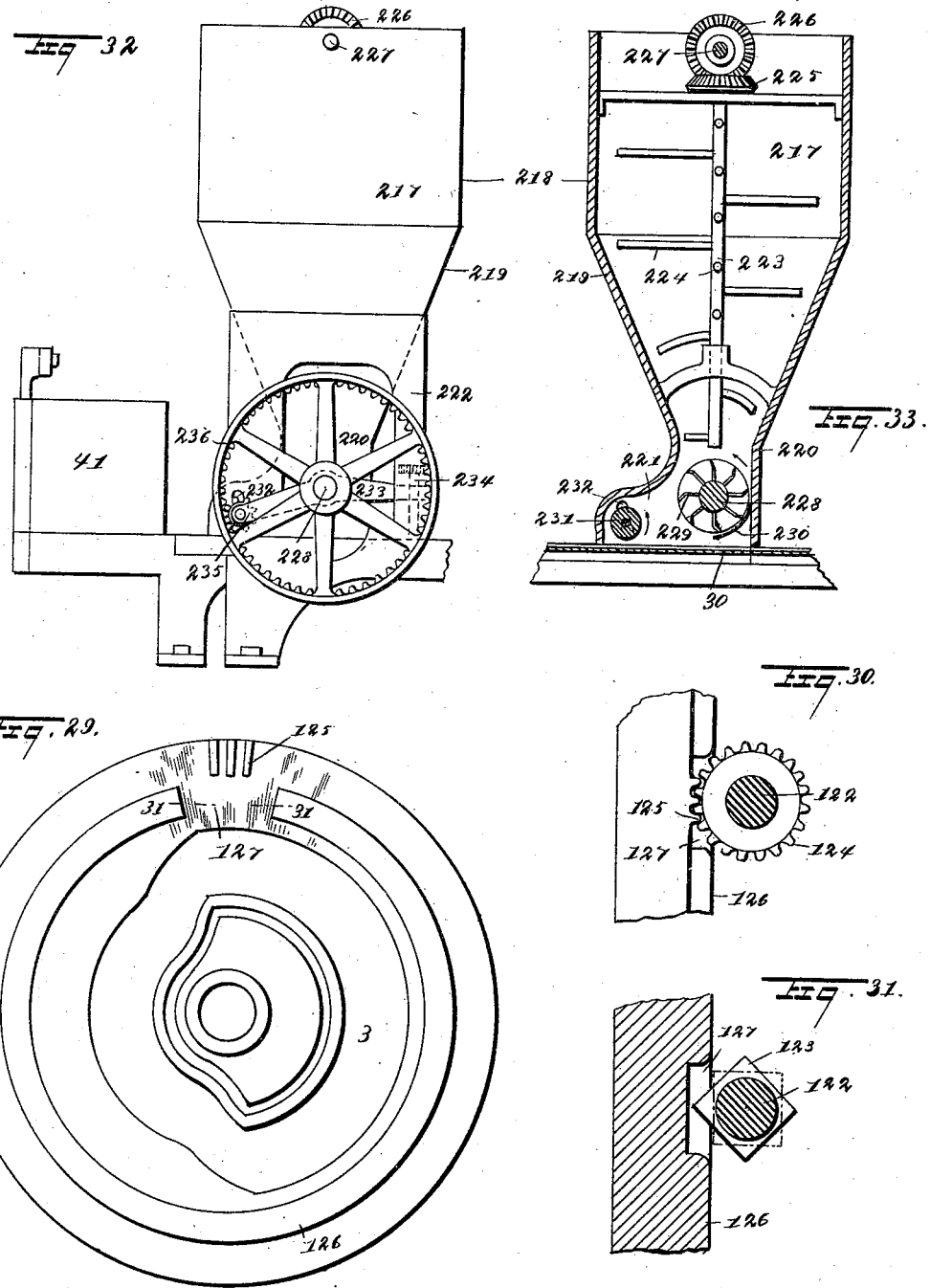

UNITED STATES PATENT OFFICE.

DOMINGO PEREZ Y BUÑOL, OF HAVANA, CUBA.

CIGARETTE-MACHINE.

SPECIFICATION forming part of Letters Patent No. 547,709, dated October 8, 1895.

Application filed August 3, 1894. Serial No. 519,363. (No model.)

*To all whom it may concern:*

Be it known that I, DOMINGO PEREZ Y BUÑOL, a subject of the King of Spain, and a resident of Havana, Cuba, have invented certain new and useful Improvements in Cigarette-Machines, of which the following is a full, clear, and exact description.

My invention relates to a machine for making cigarettes which will successively fill the requisite quantity of tobacco into a suitable receiver and wind a wrapper around the tobacco filling.

One of the objects of the invention is to enable the machine to be used for the manufacture of cigarettes having the usual cylindrical shape or a conical form, said cigarettes having either open ends or the ends of the wrapper bent or tucked inward, as will appear from the description following hereinafter. The tobacco may be employed in the shape of long fibers, (long-cut filling,) or by the addition of an accessory part the tobacco may be cut into small particles before it is fed into the receiver, (fine-cut filling.)

The invention consists in a novel arrangement and combination of parts, and also in the construction of certain mechanisms, as will be hereinafter described and claimed.

The improved machine comprises a series of mechanisms or devices which are constructed to act successively to finally produce a complete cigarette. A conveying device brings the tobacco into the path of an appliance whereby a predetermined quantity of tobacco is separated and fed forward to a receiver-section. A plunger compresses the tobacco within the said receiver-section. Another mechanism carries the receiver from its receiving position toward a wrapping device. A paper-feeding device serves to convey the wrapper-paper to a wrapper-cutter and a gumming device. A wrapper-conveyer brings the cut wrapper into the wrapping device. The latter is connected to mechanism for closing it to hold the wrapper, turning it to wind the wrapper around the filling, and moving it (*i. e.*, the wrapping device) into and out of the receiver, and an additional device serves to close the receiver while the filling is wrapped in the paper. A finishing device is employed to tuck the wrapper ends inward when this is desired. As accessories I may employ a cutter to remove the protruding ends of tobacco-fibers when a long-cut tobacco filling is employed in making the cigarettes, and when it is desired to use a filling of fine-cut tobacco a separate tobacco-cutting device is added for this purpose.

In order to fully disclose my invention, I will now proceed to describe the same specifically by the aid of the accompanying drawings, in which—

Figure 2:
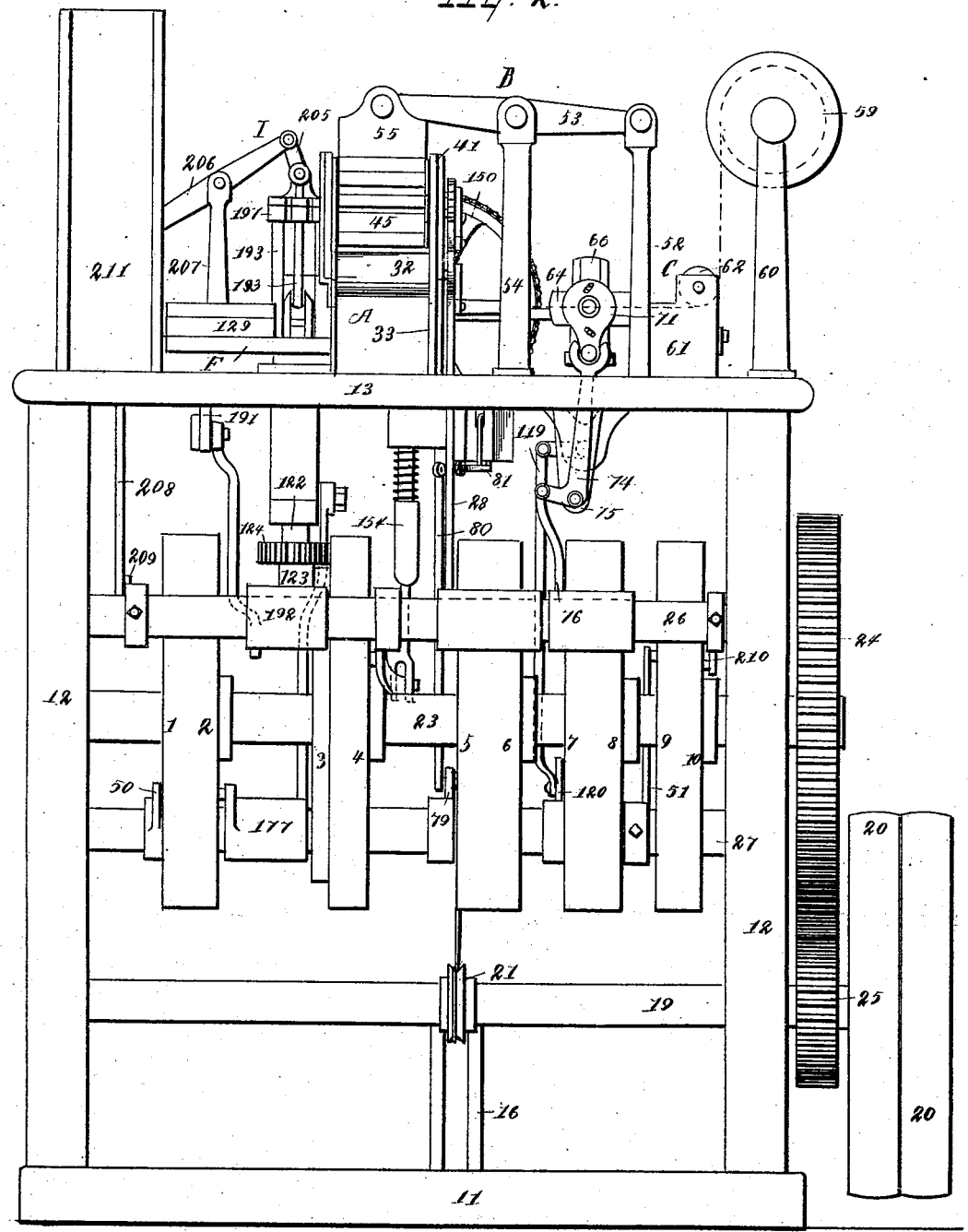
Figure 3:
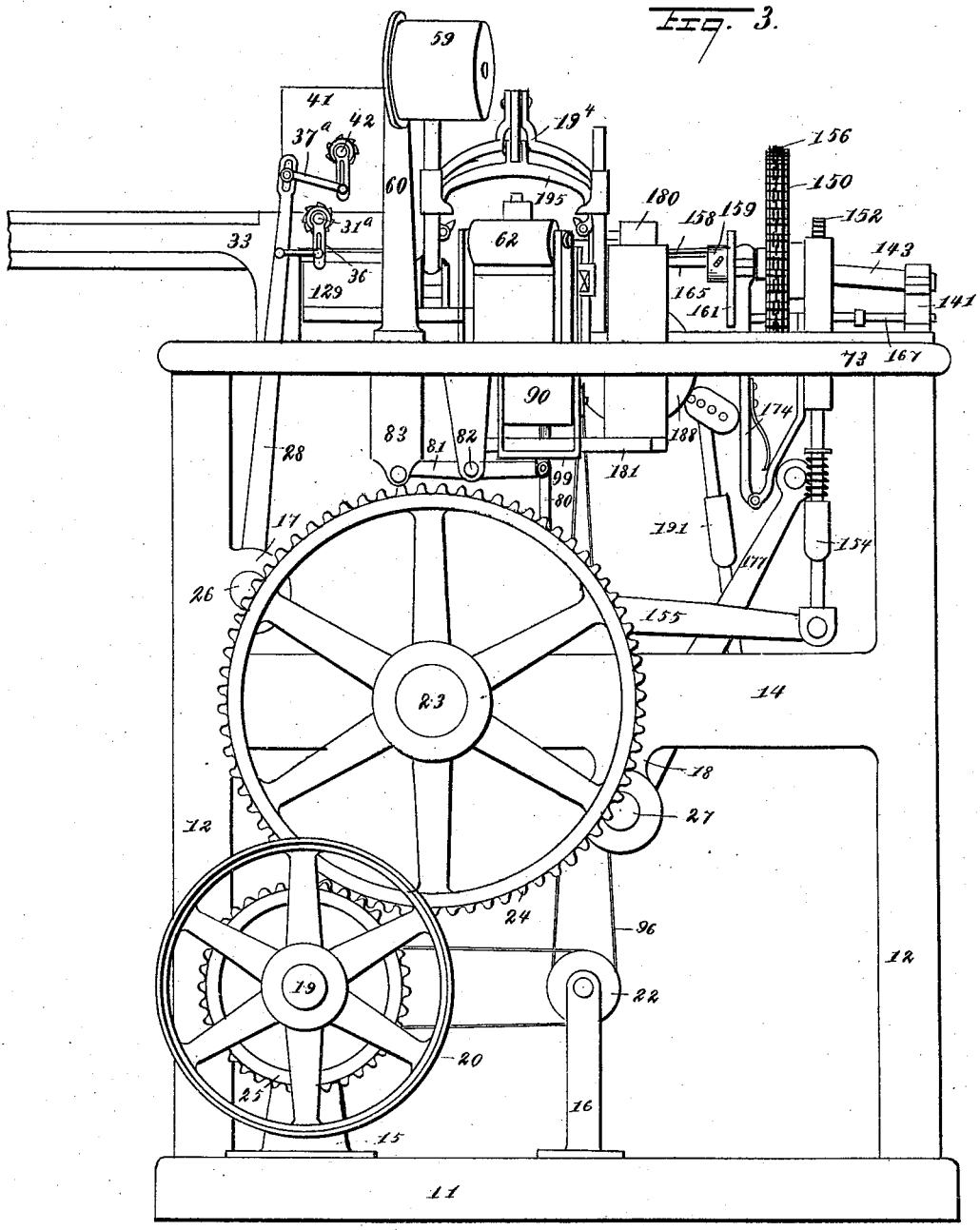

Figures 1, 2, 3, and 4 are elevations, each showing the machine as seen from one of its four sides, Figs. 1 and 2 representing opposite sides of the machine, and Figs. 3 and 4 likewise, the directions in which these views are taken being indicated in Fig. 5 by arrows marked 1, 2, 3, and 4, respectively. Fig. 5 is a plan view of the machine. Fig. 6 is a diagram with parts in section and parts broken away, illustrating the cams and levers whereby the several parts of the machine are operated. Fig. 7 is a broken side elevation of the tobacco-feeding mechanism. Fig. 8 is a cross-sectional elevation of the same on line 8 8 of Fig. 9. Fig. 9 is a longitudinal section of the same taken on the line 9 9 of Fig. 8. Fig. 9 also shows the ram for compressing the tobacco within the lower section of the receiver. Fig. 10 is a broken sectional elevation on line 10 10 of Fig. 5 of the platform carrying the lower receiver-sections, showing one of the receivers in the open position. Fig. 11 is a side elevation of one of the lower receiver-sections. Fig. 12 is an end view thereof. Fig. 13 is a broken plan view illustrating the paper-feed and the wrapper-conveying device. Fig. 14 is a side elevation of the wrapper-conveying device. Fig. 15 is a sectional elevation on line 15 15 of Fig. 13 of the paper-feed device. Fig. 16 is a side elevation of the parts shown in Fig. 15. Fig. 17 is a cross-sectional elevation of the gumming device on line 17 17 of Fig. 18. Fig. 18 is a longitudinal sectional elevation of the gumming device on line 18 18 of Fig. 17. Fig. 19 is an inverted plan view of the movable wrapper-cutting knife; Fig. 20, a side view of the same; Fig. 21, a plan view of the stationary knife. Fig. 22 is a side elevation of the wrapping device, partly in section. Fig. 23 is an end view thereof. Fig. 24 is a partial longitudinal section thereof with the wrapping-jaws open. Fig. 24ᵃ is a similar view thereof with the wrapping-jaws closed. Fig. 24ᵇ is a cross-sectional elevation showing the wrapping device within the receiver. Fig. 24ᶜ is a further detail view of the wrapping-jaws. Fig. 25 is a side elevation, partly in section, of the receiver-closing device. Fig. 26 is a side elevation of the tucker. Fig. 27 is a broken view showing a detail of the tucker, partly in section, on line 27 27 of Fig. 26. Fig. 28 is a face view of the link 198 shown in Fig. 26. Fig. 29 is a face view of one of the operating cam-disks. Fig. 30 is a top view thereof, showing it in connection with a pinion actuated thereby, the shaft of the pinion being shown in section. Fig. 31 is a sectional plan on line 31 31 of Fig. 29, showing the shaft of the pinion and its square head in position. Figs. 32 and 33 are a side elevation and a vertical section, respectively, of the device for cutting the tobacco previous to filling the lower receiver-section therewith. Fig. 34 is a broken side elevation of a rotary knife for cutting any protruding ends of tobacco-fibers in case long-cut tobacco is employed for the filling, and Fig. 35 is a plan view of the same.

Like letters and numerals refer to corresponding parts in all the views.

The machine illustrated by Figs. 1 to 31 of the drawings is constructed for the manufacture of conical cigarettes having a long-cut tobacco filling and a wrapper whose ends are tucked inward.

The machine consists of a suitable frame, which, as represented, comprises a base 11, uprights 12, a table 13, carried by the uprights, cross-bars 14, connecting the uprights, standards 15 and 16, supported on the base, and brackets 17 and 18, formed on two of the uprights 12 and on the cross-bars 14, respectively. In the standards 15 is journaled the drive-shaft 19, provided with belt-pulleys 20. The shaft also carries a grooved pulley 21, Figs. 1 and 14, and a similar pulley 22 is journaled in the standards 16. In the cross-bars 14 is journaled a shaft 23, carrying a series of disks provided with cam grooves or surfaces, whose location is indicated by the numerals 1, 2, 3, 4, 5, 6, 7, 8, 9, and 10, respectively, these cams serving to operate all the individual devices shown in Figs. 1 to 31. The cam-shaft 23 derives its motion from the drive-shaft 19, through the medium of gear-wheels 24 and 25, respectively. In the brackets 17 and 18 are journaled counter-shafts 26 and 27, respectively, which serve as fulcrums for the levers actuated by the various cams, and may also be rigidly connected to some of these levers, as will be fully described hereinafter.

The relative arrangement of the various instrumentalities of which the machine is composed is shown best in Fig. 5, in which the several devices are designated as follows: A is the tobacco-feed device; B, the device for compressing the tobacco in the lower receiver-section; C, the paper-feed device; D, the wrapper cutting and gumming device; E, the wrapper-conveyer; F, the rotating platform carrying the lower receiver-sections; G, the wrapping device; H, the receiver-closing device, and I the tucker.

I will now give a detailed description of each of the above devices.

The traveling apron 30 of the tobacco-feed device A derives its motion from the cam 6 in the following manner: The said cam 6 actuates an angular lever 28, Fig. 6, which is provided with an antifriction-roller or equivalent device 29 to engage the cam. The lever 28 is loose upon the upper counter-shaft 26, and the free arm of the lever extends upward to the tobacco-feed device A. (See, also, Figs. 2, 3, 7, and 8.) This feed device consists, primarily, of an apron 30, Fig. 9, which passes over rollers 31 and 32, journaled in a frame 33, secured to the table 13. The frame is provided with a table 34, located in the continuation of the apron and extending over the lower receiver-sections, carried by the revolving platform F. The end of the table 34 may be formed with an inclined chute 35, through which the tobacco may pass from the table into one of the lower receiver-sections. On the shaft 31ᵃ of the roller 31 is mounted a crank-arm 36, pivotally connected to a link 37, having a like connection with the lever 28. On the shaft of the said roller is also located a ratchet-wheel 38, connected to the roller so as to rotate therewith, the said ratchet-wheel being engaged by a pawl 39, pivoted to the crank-arm 36 and controlled by a spring 40. It will be understood that the crank-arm 36 turns independently of the roller 31 in one direction, so that an intermittent movement in the direction of the arrow in Fig. 9 is imparted to the apron 30 by the oscillation of the lever 28. In order that the throw of the crank-arm may be adjusted, any suitable connection, such as the slot-and-pin connection shown in Fig. 7, is employed between the crank-arm and the link 37. Above the apron 30 the frame 33 carries a casing 41, in which is journaled a shaft 42, to which an intermittent rotary motion is imparted through the medium of a ratchet-wheel 38ᵃ, a pawl 39ᵃ, controlled by spring 40ᵃ, a crank-arm 36ᵃ, to which the pawl is pivoted, and a link 37ᵃ, pivotally connected to the crank-arm 36ᵃ and to the lever 28. The pivotal connections at the ends of the link are preferably adjustable ones, or at least the connection with the crank-arm 36ᵃ. On the shaft 42 are rigidly secured two heads or spiders 43, one at each side of the casing 41, the said heads, as shown, consisting of three radial slotted arms. Pins 44 extend through the slots of the said arms, and on the said pins, between the heads 43, are suspended three tobacco-separating boxes 45, which are open at the bottom. Slides 46 are mounted on the pins within the slots of the heads 43. The pins 44 are also secured to guide-heads 47, located exteriorly of the heads 43, the said guide-heads having projections 48, adapted to engage recesses 49 in the inner walls of the casing 41. The recesses form guide-channels of rectangular or square shape for the projections 48, so that the boxes 45 will describe a square when the heads 43 are rotated with the shaft 42, it being understood that the pins 44 during this movement slide on the arms of the heads 43. The boxes 45 are maintained in a vertical position during their movement, which may be accomplished by so suspending them that their centers of gravity will be below the pins 44, or the pins may be rigidly connected to the guide-heads 46 and to the boxes 45. The operation of this device is as follows: The tobacco is placed on the apron 30 and is thereby intermittently carried toward the table 34 and under the boxes 45. At the time one of the boxes comes down onto the apron substantially in vertical alignment with the roller 31, (see Fig. 9,) the quantity of tobacco which enters the said box is divided off from the tobacco on the apron, and while the apron remains stationary the said box travels over the table 34 in the direction of the arrow marked on Fig. 9 until the box reaches the position represented at the left in the said figure. When the box moves upward from this position, the tobacco remains on the table 34 until the front end of the next box engages the tobacco and pushes it forward, so that it will drop into the chute 35 and the lower receiver-section, which is in position under the same. By reference to Fig. 7 it will be understood that the apron 30 and the boxes 45 are actuated alternately. It will be obvious that the tobacco will thus be divided into equal charges of a predetermined quantity, each charge being employed as a filling for one cigarette.

The tobacco compressing or molding device B is shown most clearly in Figs. 5 and 9 and its actuating connections in Figs. 1, 4, and 6. As illustrated in these views, the cam 1 actuates a crank-arm 50, which is rigidly secured on the lower counter-shaft 27, so that the said counter-shaft receives an oscillating movement during the rotation of the cam-shaft 23. Near the other end of the shaft 27 is fast another crank-arm 51, which has a pivotal connection with a rod 52, likewise pivotally connected to a lever 53, which is fulcrumed upon a suitable standard 54, adjacent to the casing 41. The free end of the lever 53 is pivotally connected with the plunger 55, it being understood that the connection preferably is a loose or sliding one, so as to allow the plunger to reciprocate in a vertical direction. The plunger 55 is guided in its movement by means of a screw 56, projecting through a slot 57 of the guide-frame 58. The latter, as shown in Fig. 9, is located, essentially, in vertical alignment with the chute 35, which the plunger 55 is adapted to enter when it moves downward to compress the tobacco-filling which has been previously pushed into the chute and allowed to fall into the lower receiver-section by the tobacco-separating boxes 45. The plunger shown in the drawings is made somewhat yielding at its lower end, in order that it may during its upward movement clear the shoulder formed between the forward vertical wall of the chute 35 and the guide-frame 58. It will be seen that by this construction the plunger will be caused to have a slight forward movement during its downward stroke, which may assist in forcing out of the chute particles of tobacco that may have remained therein. However, this specific construction of the plunger is not essential to my invention. As illustrated in Fig. 5, the plunger 55 is made tapering from one end to the other in a transverse direction to correspond to the tapered shape of the cavity or depression 133 in the upper face of the blocks 130, forming a part of the lower receiver-sections, as shown in the said view. It is, however, to be understood that the plunger 55, as well as the blocks 130, are exchangeable to produce conical or cylindrical cigarettes, as desired.

The paper-feed device C is shown in detail in Figs. 13, 15, and 16, and its connections and actuating mechanism will be seen best in Figs. 2, 5, and 6. This device comprises a roll 59, adapted to carry the paper from which the wrappers are to be cut. The roll is journaled in a post 60. In advance of the roll is arranged a frame 61, in which is journaled a guide-roll 62. In operation the paper passes under this guide-roll, as indicated in Fig. 2, and then extends forward over a table 63 to a paper-clamp C'. The said clamp consists of a slide 64, having guided essentially horizontal movement on the frame 61. The slide itself is provided with essentially vertical guideways 65, in which slides 66 are adapted to move up and down. The slides 66 carry arms 67, extending transversely over the table 63 and provided with clamping-jaws 68, adapted to pass into longitudinal slots 69, produced in the said table. It will be understood that the upper and lower jaws are adapted to clasp the paper between them. In the slide 64 is journaled a rock-shaft 70, carrying a plate 71, provided with inclined slots 72, which engage pins 73, secured to the upper and the lower slide 66, respectively. The plate 71 is pivotally connected to a bell-crank lever 74, fulcrumed in a bracket 75, projected from the table 13, Fig. 2, and the said bell-crank lever has a pivotal connection with another bell-crank lever 76, which is loosely mounted upon the counter-shaft 26 and whose free end is engaged and actuated by the cam 8, Fig. 6. It will be obvious that the oscillating motion which is imparted to the bell-crank lever 74 by the above-described means will cause the plate 71 to turn and thereby force the jaws 68 together to clamp the paper between them. The further movement of the lever 74 will then cause the slide 64 and clamp C' to move forward toward the wrapper cutting and gumming device D, the paper being fed to the cutting device by the said movement of the clamp. The slide 64 may be provided with stops 77, adapted to be engaged by the upper arm of the bell-crank lever 74 when the same assumes a predetermined oblique position. When the lever 74 swings backward, the slide 64 remains stationary at first, the jaws 68 opening by the action of the slots 72 on the pins 73, so as to release the paper, and then the slide 64 moves back to its original position. A clamp, such as a spring 78, Fig. 15, is preferably employed in connection with the guide-roller 62 to prevent accidental rearward movement of the paper.

The wrapper-cutting device and the gumming device, designated as D, are operated in unison, each of them deriving its movement from the cam 5, which actuates a lever 79, loose upon the counter-shaft 27, (see Figs. 2, 3, and 6,) the said lever being connected with a rod 80, whose upper end has a pivotal connection with a lever 81, (see, also, Fig. 18,) fulcrumed at 82, upon a suitable support. One end of the lever 81 is connected to the operating-rod 83 of the cutting device and the other end to the gumming device.

The wrapper-cutting device (see Figs. 5, 13, and 19 to 21) consists of a stationary lower knife D' and a movable upper knife D², the latter being reciprocated up and down by means of the rod 83. The stationary knife D' comprises a plate 84, secured to the table 13 and provided with two removable blades 85, which are set at an angle to each other and inclose a recess 86 between them. The angle between the blades may be adjusted within certain limits by means of the set-screws which serve to secure the blades and washers placed between one of the blades and the plate 84. It will be understood that triangular waste pieces of paper will remain in the said recess and will have to be removed by the operator from time to time. The movable knife D² comprises a shank 87, having attached to it removable blades 88, one of which is adjustable similarly to the corresponding stationary blade 85. It will be obvious that the knives will cut wrappers of the trapezoidal shape shown at 89 in Fig. 13, these wrappers being employed for frusto-conical cigarettes. When it is desired to produce cylindrical cigarettes, one of the stationary blades and the corresponding movable blade are removed. In this case there will be no waste pieces.

The gumming device is indicated at D³ in Figs. 5 and 13. It is shown in detail in Figs. 17 and 18, and consists of a stationary mucilage-tank 90, secured to the under side of the table 13, and having journaled in its interior the rolls 91 and 92, preferably of different diameters. The rolls are compelled to rotate in unison by the means of gear-wheels 93 and 94, secured on their shafts, and on one of the said shafts is also secured a grooved pulley 95, adapted to be driven from the pulleys 21 and 22 through the medium of a transmission-cord 96. (See Figs. 1 and 3.) The tank 90 is provided in its upper part with slots 97, through which extends the upper bar of a frame or yoke 98, pivotally connected to the lever 81. On the said upper bar of the yoke is loosely mounted a roll 99. This roll is adapted to be intermittently raised against the paper adjacent to the stationary knife D', so as to gum the paper at the edge of the wrapper. The paper is gummed at the same time that the wrapper is cut, or approximately so. It will be understood that the roll 91 takes up the mucilage from the lower part of the tank and conveys it to the roll 92, from which it is taken by the roll 99. In order to regulate the quantity of mucilage fed to the roll 99, I provide a scraper 100, extending adjacent to the periphery of the roll 92. This scraper, as shown, is pivoted to the tank 90 and may be adjusted by means of a set-screw 101, screwing into a cross-bar 102, secured to the tank.

In order to hold the free end of the paper stationary during the cutting and gumming operation and to feed the wrapper to the wrapping device, I provide the wrapper-conveying device E. On the table 13 are secured guideways 103, Figs. 1, 5, 13, and 14, on which is adapted to move a slide 104, the direction of the sliding movement being approximately perpendicular to that of the wrapping device G, as will be more fully described hereinafter. The slide 104 is provided with a rack 105, adapted to be engaged by a toothed sector 106, mounted on a shaft 107, which is journaled in a bracket 108, depending from the table 13. To the slide 104 are also rigidly secured sleeves 109, through which passes a rod 110. One end of the said rod has an operative connection with a lower jaw 111, pivoted to the slide 104 and adapted to co-operate with a fixed upper jaw 112, likewise secured to the said slide. On the rod 110 are secured fixed collars 113, preferably in an adjustable manner, and loose collars 114, a spring 115 being interposed between each fixed collar and the corresponding loose collar to force the latter against an arm or yoke 116, mounted on the shaft 107. The arm 116 and the sector 106 are so mounted upon the said shaft that they are capable of independent movement thereon. The sector 106 is provided with lugs 117, adapted to be engaged by the arm 116. Set-screws 118 may be provided to adjust the extent of the independent movement of the arm 116 relatively to the sector 106. The arm 116 is of bell-crank formation and is pivotally connected to a rod 119, having a like connection with a lever 120, fulcrumed upon the lower counter-shaft 27 and controlled by the cam 7. It will be understood that an oscillating motion is imparted to the arm 116, and when the said arm moves forward it first slightly compresses the spring 115, which is next to the jaws 111 and 112, and at the same time causes the rod 110 to slide, so as to swing the lower jaw upward and clamp the end of the paper between the said jaws. This is done at the time the feed of the paper has ceased and before the movable knife comes down to cut the wrapper. Thus during the cutting operation the paper will be held by a clamping device both in advance of the knives by means of the jaws 111 and 112 and in the rear thereof by means of the clamp C'. An accurate operation of the cutting device is secured by this arrangement. As the arm 116 continues its forward rocking movement it will come in contact with the point of one of the set-screws 118 or the corresponding lug 117 and thus turn the sector 106, whereby the slide 104 is caused to advance, the clamp formed by the jaws 111 and 112 remaining closed, so that the wrapper 89 is carried forward to the wrapping device G. The front edge of the wrapper will then be taken hold of by the wrapping device, as is more fully described hereinafter, and then the arm 116 swings back, causing at first the rod 110 to slide while the slide 104 remains stationary, whereby the jaw 111 is caused to swing downward to release the wrapper, whereafter the arm 116 collides with the other set-screw 118 or the other lug 117 and moves the slide 104 backward bodily, the jaw 111 remaining in its lower position, so that at the end of the return stroke the clamp formed by the jaws 111 112 is ready to receive the front end of the paper when the same is again fed foward by the feed device C. To the front end of the slide 104 may be secured an arm 121, Fig. 5, whose office is to push the finished cigarette out of the lower receiver-section when the latter gets opposite the wrapper-conveying device E, it being understood that the arm 121 is bent in such a manner as not to interfere with the movements of the various mechanisms.

I will now describe the rotating platform F, carrying the lower receiver-sections, and the means for actuating it. These parts are shown best in Figs. 1, 2, 5, 6, 9 to 12, 29, 30, and 31. The platform F is supported above the table 13 upon a vertical shaft 122, whose lower end is made square, as shown at 123, Fig. 31. The shaft also carries a pinion 124 above the square portion. The pinion 124 is adapted to engage a series of teeth 125, provided on the surface of the disk which carries the cam 3. On the same surface is also produced a plane surface 126, annular, as shown, which is interrupted or recessed at the portion adjacent to the teeth 125, as indicated at 127. The recess is of sufficient depth to allow the square portion 123 to turn therein when the teeth 125 engage the pinion 124, while normally the square portion remains in contact with the plane surface 126, so as to hold the shaft against rotation. The pinion 124 and teeth 125 are so constructed that at each revolution of the camshaft 23 the platform F will receive a partial rotation, sufficient to bring each lower receiver-section into the position occupied immediately before by the adjacent lower receiver-section—that is, if there are four lower receiver-sections, as shown in the drawings, the platform will receive a partial rotation of ninety degrees at each revolution of the camshaft.

The platform F has secured to it vertical guides 128, which between them inclose a space adapted to contain one of the blocks 130. The guides may be set in slots of the platform, as indicated in Fig. 10. For a purpose to be stated hereinafter one of the guides 128, the forward one in the direction of the rotation, is made higher than the other 129. The blocks are set loosely between the guides and consist of a shank 131, extending downwardly, and a head 132, which in its upper surface is formed with a depression 133, whose shape corresponds to that of the cigarette to be made—that is, for the production of conical cigarettes the depression or cavity 133 is tapered, as shown in Figs. 5, 10, 11, and 12. For the production of cylindrical cigarettes the depression 133, obviously, will be made of uniform width and depth. It will be understood that the blocks 130 are readily removable and exchangeable. Each block, together with its guides 128 and 129, forms a lower receiver-section. A shoulder 134 is formed between the head 132 and the shank 131 of the block 130, the said shoulder being adapted to rest on suitable stops, such as cross bars or supports 135, connecting the guides 128 and 129, Figs. 9 and 25.

The positions which the lower receiving-sections assume when the platform F is stationary are clearly shown in Fig. 5.

It will be obvious that the number of the lower receiver-sections may be increased or reduced, in which cases the extent of the angular movement of the platform would have to be changed correspondingly—that is, if there are three lower receiver-sections the partial rotation of the platform will each time be through an angle of one hundred and twenty degrees, or one-third of a complete revolution, and similarly if there are five lower receiver-sections the platform will rotate intermittently, each time accomplishing one-fifth of a complete revolution.

The wrapping device G, Figs. 22, 23, and 24, comprises guides 136, secured to the table 13, and a slide 137, having longitudinal movement in the said guides in a direction which essentially coincides with the axis of one of the lower receiver-sections when the platform F is stationary. On the said slide are located two bearings 138 and 139, which are vertically adjustable, for instance, through the medium of set-screws 140, working in corresponding slots of the bearings, (see Fig. 1,) the screws screwing into standards 141 and 142, which are rigidly secured to the slide 137. In the said bearings is journaled a shaft 143, having a longitudinal groove 144, working in conjunction with a pin 145, or equivalent means, whereby a sprocket-wheel 146, mounted on the said shaft, will be caused to rotate it, yet allowed to be held against longitudinal movement when the shaft is advanced or retracted with the slide 137. The sprocket-wheel is rigidly connected with a grooved collar 147, adapted to be engaged by a fork or arm 148, which is secured to a bracket 149, located upon the table 13. (See Fig. 5.) By this means the sprocket-wheel 146 is held in transverse alignment with another sprocket-wheel 150, journaled in the bracket 149 and carrying on its shaft a pinion 151. This pinion is adapted to be intermittently rotated through the medium of a rack 152, which has a yielding connection 153 with a rod 154, or the rack may be made integral with the said rod. The lower end of the latter is pivotally connected to a lever 155, loosely mounted on the upper counter-shaft 26, controlled by the cam 4, as will be seen in Fig. 6. A chain 156 is employed to connect the sprocket-wheels 150 and 151. By means of this mechanism an intermittent rotary motion is given to the shaft 143. One or more complete revolutions are imparted to the shaft at each operative stroke of the rack. To the front end of the shaft 143 is secured a sleeve-like portion 157, forming the rear end of an upper clamping-jaw 158, it being understood that this jaw is stationary relatively to the shaft. The part 157 is surrounded by another sleeve 159, loosely mounted thereon so as to be capable of turning and longitudinal sliding movement in relation thereto. The sleeve 159 is provided at its rear end with a flange 160, that takes into an annular groove formed between a plate 161 and a cap-ring 162, so that the sleeve can rotate in the said groove. The sleeves 159 and 157 are provided with an inclined slot 163 and a segmental slot 163$^a$, respectively, through which passes a pin 164, secured to the lower end of a movable lower clamping-jaw 165. The said jaw is fitted with an aperture extending substantially at right angles to the pin 164, and through the said aperture extends loosely a pin 166, Fig. 24, which enters holes in or is secured to the sleeve 157, forming a part of the upper jaw 158. The office of the pin 166 is to guide the lower jaw 165 during its movement to or from the upper jaw. If desired another pin, identical with 166, may be arranged in the rear of the pin 164 to better guide the lower jaw. The plate 161 is secured to the front end of a rod 167, arranged below the shaft 143 and having guided movement in the standards 141 and 142. On the said rod are secured, by means of set screws or in any other suitable manner, two collars 168 and 169, respectively. Between the front collar 168 and the standard 142 a spring 170 is coiled on the rod 167. The rear collar 169, is adapted to be engaged by a spring-pressed pawl 171, pivoted to the slide 137 and so arranged that in the outer position of the said slide, Fig. 5, it will engage a stop 172, secured to one of the guides 136, to swing the pawl laterally out of the path of the collar 169. The collar 168 is adapted to be actuated by a lever 173, pivoted to a frame 174, extending downward from the slide 137. A spring 175 exerts rearward pressure upon the said lever. The latter is adapted for engagement with the head 176 of a lever 177, said head engaging with one side of the frame 174. The lever 177 is a bell-crank lever loosely mounted on the counter-shaft 27 and actuated by the cam 2. (See Figs. 3, 4, and 6.)

The operation of the wrapping device is as follows: When one of the lower receiver-sections 130 has been filled with tobacco and carried adjacent to the wrapping device by a partial rotation of the platform F, the head 176 of the lever 177 swings forward and moves the lever 173, at the same time actuating the frame 174 of the slide 137, so that the latter advances toward the platform. The lever 173 engages the collar 168 and thus causes the rod 167 to slide forward in the standards 141 and 142. In consequence thereof the plate 161 and the sleeve 159 are carried forward, while the sleeve 157 remains stationary. The pin 164 rides up the inclined slot 163 of the sleeve 159, and thus the lower jaw 165 is gradually moved toward the upper jaw 158. The movement is so adjusted that the jaws do not fully close, Fig. 24$^a$, before the slide has reached its innermost position. During the forward movement of the slide the jaws 158 and 165 pass approximately centrally above the guides 128 and 129 of the adjacent lower receiver-section, the open space between the jaws being at a slightly higher level than the upper edge of the guide 129, as shown in Fig. 24$^b$. At the same time the wrapper 89 is fed forward by the wrapper-conveying device E, and the edge of the wrapper enters above the edge of the guide 129 and between the jaws 158 and 165 of the wrapping device. The upper edge of the guide 129 is beveled, so as to direct the edge of the wrapper upward, if necessary, and the guide 128 being higher than 129 will form a stop for the wrapper, which otherwise might be carried over the upper edge of guide 128. At this moment the jaws close so as to hold the wrapper, while the wrapper-conveying device recedes, releasing the wrapper at the same time, as described. By means of the receiver-closing device H, to be described presently, the receiver formed of the lower receiver-section hereinbefore described, in conjunction with an upper receiver-section 185, to be described hereinafter, is closed to form a chamber or cavity of essentially the shape of the finished cigarette. The jaws 158 and 165 are then in the upper part of the receiver, the free end of the wrapper still protruding above the upper edge of the guide 129. It will be understood that the jaws are exchangeable and are shaped corresponding to the intended form of the cigarette. In the drawings the jaws are shown as tapering toward their outer free ends. The clamping-faces of the jaws are preferably made with a conical curvature. (See Fig. 23.) During their forward movement the jaws 158 and 165 do not rotate. When, however, the jaws are fully within the receiver and the wrapper 89 is clamped between them, the sprocket-wheel 146 is turned by the mechanism hereinbefore described, and the jaws then rotate around the filling in the receiver containing the same, thereby winding the wrapper on the tobacco-filling. The gummed edge of the wrapper will come in contact with the opposite edge, and the cigarette is then substantially finished and may be removed from the receiver without undergoing any further treatment. When the jaws 158 and 165 recede with the slide 137 upon the return movement of the lever 177, they will separate to release the wrapper, as the spring 170 retracts the rod 167 and plate 161 with the sleeve 159. If the jaws were allowed to open at once to the full extent, they would crush the cigarette within the receiver. During the forward movement of the wrapping device, however, the spring-controlled pawl 171, as soon as it clears the stop 172, swings against the rod 167 in the rear of the collar 169, and thus limits the rearward movement of the rod 167 under the influence of the spring 170, and thereby also limits the opening movement of the jaws. When the slide again approaches its outer position, the pawl 171 will collide with the stop 172 and swing clear of the collar 169, thus allowing the spring 170 to act to fully open the jaws 158 and 165. It will be obvious that when the shaft 143 is inclined, as illustrated in the drawings, the jaws will describe a conical surface during the rotation of the shaft, so that the wrapper will be properly placed around the filling. By adjusting the bearings 138 and 139 the inclination of the shaft 143 can be changed to suit various degrees of conicity of the cigarette, or when it is desired to make cylindrical cigarettes the bearings will be so adjusted that the shaft will be horizontal. In each of these cases I attach to the shaft a different set of jaws 158 165, having the proper angular position relative thereto. It will be understood that the jaws are in an essentially horizontal position both when they enter and when they leave the receiver.

The receiver-closing device H, whose cooperation with the wrapping device I have already mentioned, is illustrated in detail in Fig. 25, while its connections appear most clearly in Figs. 4, 5, and 6. This device consists of vertical guides 178, secured to the table 13, and receiving between them two slides 179 and 180, respectively. To the lower slide 179 is secured an arm 181, extending under the table and under the block 130 of the lower receiver-section when the same is in operative relation to the wrapping device. The said arm carries two or more bars 182, projecting upward through openings 183 in the table 13 and adapted to engage the bottom of the said block. The upper slide 180 is provided with an arm 184, carrying an upper receiver-section 185, which, together with the block 130 of the lower receiver-section, is adapted to inclose a cavity whose shape corresponds to that of the cigarette. A suitable space, however, is left for the lateral insertion of the wrapper. Each of the slides has secured to it a screw or pin 186, which works in eccentric or cam slots 187 of a disk 188, pivoted at 189 to the table 13. The disk is provided with an extension 190, which is pivotally connected to a rod 191. The latter has a like connection with an elbow-lever 192, loosely mounted on the upper counter-shaft 26 and actuated by the cam 3. The connection between the extension 190 and the rod 191 may be an adjustable one, as illustrated in Figs. 3, 4, and 25, to permit of regulating the throw of the said extension, and consequently the extent of the vertical movement of the slides 179 and 180. As above described, the block 130 and upper receiver-section 185 are moved toward each other each time one of the lower receiver-sections is in operative relation to the wrapping device. The upper edge of the guide 128 is sharpened, so that when the upper receiver-section 185 moves downward any protruding tobacco fibers will be cut by the shearing action of the said guide and the edge of the said upper receiver-section. The upper receiver-section 185 is raised by the slide 180 when the disk 188 swings in direction of the arrow marked on Fig. 25, while the block 130 returns to its former position to rest on the supports 135, either by gravity, or if it should fail to do so, the next operation of the plunger 55 will bring it down to its seat.

When it is desired to produce cigarettes whose wrappers are tucked inward at their ends, I employ the tucker I. (Represented in Figs. 26, 27, and 28.) It will be understood that in this case the wrappers are made somewhat longer than for cigarettes of the usual pattern, so as to protrude at each end of the receiver. The wrappers for cigarettes of the usual pattern are made of the same length as the receiver, or approximately so, and therefore will not project into the path of travel of the tucker. This tucker has vertical movement on three columns 193, Fig. 5, one of which aligns with the shaft 122, on which the platform F is mounted, while the other two are located adjacent to the guides 136 of the wrapping device G. The tucker consists of two superposed sliding frames or yokes 194 and 195, respectively, each provided with three sleeves, 196 and 197, respectively, adapted to slide on the columns 193. The yokes are connected by means of a slotted link 198, Fig. 28, which permits the upper yoke to move independently of the lower one during the first part of the upstroke. The upper sleeves 196 are provided with set-screws 199 and the lower sleeves 197 with pins 200. The said screws and pins are engaged by the slots 201 and 202, respectively, of tongues 203, the screws 199 forming pivots for the said tongues, while the pins 200 compel the tongues to turn inwardly on their pivots when the upper sleeves move away from the lower ones. For this purpose the upper ends of the slots 202 are inclined outward and downward. By adjusting the tongues so that the screws 199 will be nearer to or farther from the ends of the slots 201 the pivotal movement of the tongues may be varied, as desired. The tongues are provided with points 204, which may be pivoted and adjustable by means of clamping-screws or the like, as shown at 203$^a$. The yoke 195 is also provided with points 204$^a$. The upper yoke 194 is connected by means of a link 205, Fig. 2, to a lever 206, fulcrumed upon a standard 207. The lever is adapted to be actuated through the medium of a connecting-rod 208, Fig. 4, secured to a crank-arm 209, mounted on the upper counter-shaft 26 to oscillate therewith. A rocking movement is imparted to the said shaft by means of a crank-arm 210, rigidly mounted thereon and controlled by the cam 10, Figs. 2 and 6. During their downward movement the yokes 194 and 195 remain in contact with each other, the friction between the sleeves 197 and the columns 193 being sufficient to prevent independent movement of the lower yoke. The points 204 are therefore in their outer position, as indicated in Fig. 26. The points 204$^a$ are so arranged that they will pass close to the ends of the receiver, and therefore tuck the upper parts of the protruding wrapper ends downward and inward. The upper yoke 194 then begins to move upward, while the lower yoke 195 remains stationary for a definite period, and by the engagement of the pins 200 with the walls of the slots 202 the tongues 203 and points 204 are caused to swing inward to engage the wrapper ends from below and tuck the lower parts of said ends upward and inward. Thereupon the two yokes move upward in unison, leaving the finished cigarette in the receiver. The upper section 185 of the receiver then moves upward, as hereinbefore described, so that the platform F is again free to rotate.

It will be obvious that when the wrapper ends are folded in the above-described manner the gumming of the wrapper-edge may be dispensed with.

The operation of the machine has now been described in all its details, and the succession in which the various mechanisms work will be readily understood by a glance at Fig. 5, as in the first position of the lower receiver-section (shown at P') the tobacco is inserted and rammed into the lower receiver-section. In the second position P$^2$ the wrapper is inserted and wound around the tobacco, and thereupon the ends of the wrapper are tucked inward, if wrappers of sufficient length are used, while in the third position P$^3$ the finished cigarette is pushed out of the lower receiver-section, by means of the arm 121, into a receptacle 211, in which the cigarettes may be piled up by the attendant of the machine. It will be obvious that a chute leading to a suitable box may be substituted for the receptacle 211. The arm 121 may be omitted and the cigarettes taken out by the operator.

By reference to the views representing the tucker I it will be obvious that this device may be readily removed from the columns 193 after loosening the connection between the upper yoke 194 and the link 205. It is desirable in some cases when long-cut tobacco is used for the filling and the wrapper ends are not tucked inward to cut the ends of the tobacco fibers protruding at the ends of the receiver. For this purpose I provide the rotary cutter shown in Figs. 34 and 35, said device consisting of a yoke 212, adapted for connection with the above-mentioned link 205 and provided with sockets or sleeves 213, fitted to slide on the columns 193 in the same manner as the sleeves 196 of the yoke 194. In the yoke 212 is journaled the shaft 214, carrying the cutter-disks 215 and adapted to receive a continuous or an intermittent rotary motion through the medium of a grooved pulley 216, driven from a suitable part of the machine. The cutter-disks are so placed relatively to the columns that they will pass adjacent to the end surfaces of the receiver to cut the protruding ends of tobacco. The operation of this cutter will be obvious.

Finally, I will describe an apparatus for reducing long or irregularly cut tobacco to fine-cut tobacco which I have fitted on my machine, since such an addition is often desirable. The said apparatus is located above the apron 30 of the tobacco-feed device in a position which will be preferably clear from Fig. 32. The hopper 217, Figs. 32 and 33, is open at the bottom, so that the tobacco issuing at the bottom can pass directly onto the apron 30. The upper portion 218 of the hopper is of uniform cross-section, then follows a tapering portion 219, a short narrow portion or throat 220, and an enlarged bottom portion 221. The hopper is supported in a frame or box 222, which has been omitted in Fig. 33. In the center of the hopper is arranged a vertical shaft 223, to which are secured a series of bars 224, constituting an agitator. The shaft 223 receives its motion through the medium of bevel-wheels 225 and 226, of which the latter is mounted on a shaft 227, driven from a suitable part of the machine. In the narrow portion of the hopper is located a rotary cutter, which consists of an essentially horizontal shaft 228, provided with a series of scoop-shaped blades 229, whose sharp outer edges face in the direction in which the cutter is adapted to rotate. Any suitable driving connection is employed for rotating the shaft 227. In the enlarged bottom portion 221, at the rear end thereof and adjacent to the rotary cutter, is arranged a curved shield 230, secured to the hopper 217 and adapted to act as a stationary knife co-operating with the blades 229 of the cutter. At the front end of the enlarged portion 221 is located a delivery-roller 231, whose shaft extends outward through a slot 232 of the tobacco-hopper, said shaft being journaled in arms 233, which are loosely mounted on the cutter-shaft 228. The delivery-roller 231 is made of soft rubber or otherwise so constructed that it will be capable of throwing the tobacco back in the opposite direction to the apron 30. By means of a screw 234 or an equivalent device the arms 233 may be turned to adjust the delivery-roller 231 relatively to the apron 30. The delivery-roller is rotated by means of a pinion 235, meshing with an internally-toothed wheel 236, secured on the cutter-shaft 228. Thus the delivery-roller and the cutter will be rotated in the same direction. In operation the tobacco is fed into the hopper at the top and is kept in motion by the rotary agitator while traveling downward to the throat 220. As the delivery-roller 231 will allow but fine-cut tobacco to pass out of the receptacle on the apron 30, and since the said roller, owing to the direction of its rotation, also has a tendency to throw back any particles which are too large to pass below it, all the particles exceeding a certain size will be brought into the path of the cutter-blades 229, which, on account of their scoop shape, will readily take up such particles and carry them around till they are sufficiently small to pass out on the apron 30. By adjusting the delivery-roller relatively to the apron the quantity of material delivered can be regulated.

I do not confine myself to the exact constructions shown in the drawings and described with reference thereto; but I desire it to be understood that various changes may be made within the scope of the appended claims.

What I claim as new, and desire to secure by Letters Patent, is—

1. A cigarette machine, comprising a receiver adapted to contain the filling, a wrapping device for winding a wrapper around the filling in the receiver, a wrapper cutting device, a conveying device for feeding the cut wrappers to the said wrapping device, and means secured to the conveying device, for holding and releasing the wrappers, substantially as described.

2. A cigarette machine, comprising a series of connected receiver sections adapted to hold the fillings, a mating receiver section to complete the receiver a wrapping device constructed to enter the said receiver to wind the wrappers around the fillings therein, and mechanism for successively carrying each of the connected receiver sections from the position in which it receives the tobacco into operative relation to the wrapping device, substantially as described.

3. A cigarette machine, comprising a series of connected receiver sections constructed to move in unison, a mating receiver section to complete the receiver a device for successively filling the said connected sections with tobacco, a wrapping device constructed to enter the said receiver to wind the wrappers around the fillings therein, and a mechanism for intermittently advancing the series of connected receiver sections to successively carry each of them from the position in which it receives the filling into operative relation to the wrapping device, substantially as described.

4. The combination, with the apron, of a series of tobacco separating boxes connected to move in unison, and guides for causing the said boxes to first approach the apron then move longitudinally thereof, and then recede from the apron, as and for the purpose set forth.

5. The combination with the apron, of a rotary shaft, a slotted arm thereon, a tobacco separating box provided with a pin extending through the slot of the said arm, and guides for causing the box to first approach the apron, then move longitudinally thereof, and then recede from the apron, as and for the purpose set forth.

6. The combination of the rotary shaft, a slotted arm thereon, a pin extending through the slot of the arm, a tobacco separating box hung on the said pin, and rectangular guides to cause the said box to perform a rectangular movement during the rotation of the shaft, substantially as and for the purpose set forth.

7. The combination, with the apron, of the casing arranged above the same and provided with rectangular guide channels on its inner faces, a shaft journaled in the said casing, radially slotted arms on the shaft, pins extending through the slots of the arms, tobacco separating boxes hung on the said pins between the corresponding slotted arms, and guide heads secured to the pins exteriorly of the slotted arms and adapted to engage the guide channels of the casing, substantially as and for the purpose set forth.

8. The combination, with the lower receiver section, the inclined chute above the same, and a tobacco feed device having movement toward the said chute, of a guide frame above the chute and forming a shoulder therewith, and a plunger having vertical movement in the said frame and the chute, the lower portion of the plunger being yielding so that it will move toward or from the wall of the chute when the said portion comes in contact with the shoulder formed between the guide frame and the chute, substantially as described.

9. A paper feed device, comprising a reciprocating slide having movement in the direction of the feed, supplemental slides having guided movement in the first named slide essentially perpendicular to the movement thereof, jaws secured to the said supplemental slides, and means for moving the said slides carrying the jaws toward and from each other, substantially as described.

10. A paper feed device, comprising a reciprocating slide having movement in the direction of the feed, clamping jaws having sliding connection with the said slide and adapted to move essentially perpendicular to the direction of the feed, a rock shaft journaled in the slide, and an operative connection between the rock shaft and the clamping jaws to move the latter toward or from each other, substantially as described.

11. A paper feed device, comprising a reciprocating slide having movement in the direction of the feed, clamping jaws having sliding connection with the said slide and adapted to move essentially perpendicular to the direction of the feed, a rock shaft journaled in the slide, a plate secured to the rock shaft and provided with cam slots, means for operating the plate, and pins connected to the jaws and engaging the said slots, substantially as described.

12. A paper feed device, comprising a reciprocating slide having movement in the direction of the feed, a table over which the paper is adapted to pass, said table being provided with a longitudinal slot, clamping jaws having sliding connection with the slide and having movement relatively thereto essentially perpendicular to the table to engage or release the paper thereon, said jaws being arranged in alignment with the slot of the table, and means for opening and closing the jaws, substantially as described.

13. The combination of the longitudinally slotted table, the reciprocating slide having movement essentially parallel thereto, the clamping jaws having sliding connection with the slide and adapted to move essentially perpendicular to the table toward or from the slot thereof, the oscillating plate journaled in the slide, an operative connection between the said plate and the clamping jaws to move the same in unison toward or from each other, and means for turning the said plate and actuating the slide, substantially as described.

14. The combination with the feed device having reciprocating movement in the direction of the feed and provided with a clamp to draw the paper forward, and the cutting device located in advance of the reciprocating feed device and adapted to cut the paper into wrappers, of a reciprocating wrapper conveying device provided with a clamp located in advance of the cutting device and adapted to hold the paper while it is being cut, and then carry the wrapper forward, substantially as described.

15. The combination, with the slide having a rack and a fixed jaw, of a movable jaw pivoted to the slide, a sliding rod connected to the movable jaw, a rocking arm adapted to actuate the sliding rod, and a toothed sector engaging the rack of the slide and provided with lugs or abutments between which extends the said rocking arm, the latter being capable of moving independently of the toothed sector, substantially as described.

16. The combination, with the slide having a rack and a fixed jaw, of a movable jaw pivoted to the slide, a sliding rod connected to the movable jaw, a rocking arm having an elastic operative connection with the sliding rod, a toothed sector pivoted concentrically with the said arm and engaging the rack of the slide, said arm being capable of moving independently of the sector, and abutments secured to the sector on each side of the arm and adapted to be alternately engaged thereby, substantially as described.

17. The combination, with the paper feed device and the wrapper conveying device, of a wrapper cutting device, located in advance of the feed device, and a gumming device adapted to gum the edge of the wrapper adjacent to the cutting device, substantially as described.

18. The combination, with the paper feed device, and the wrapper conveying device, of a wrapper cutting device located in advance of the feed device, and a gumming device operatively connected to the cutting device to move in unison therewith and gum the edge of the wrapper adjacent to the cutting device, substantially as described.

19. The combination, with the series of connected receiver sections, and means for intermittently advancing them, of a tobacco feed device adapted to convey the tobacco to the receiver sections, a device for closing the receivers of which said sections form a part, a paper feed device and a wrapper conveying device for carrying the wrappers to the receiving sections, said wrapper conveying device being provided with an arm adapted to push the finished cigarettes out of the receiver sections, and a wrapping device for winding the wrappers around the tobacco fillings, substantially as described.

20. In a cigarette machine, a rotatable platform, radially disposed blocks carried by the platform and capable of movement perpendicular to the plane of the platform, said blocks forming part of a receiver, an additional receiver section to complete the receiver, and means for moving each receiver block toward the said additional receiver section to close the receiver, substantially as described.

21. The combination of the platform, the essentially radial guides secured thereto, the receiver blocks set radially between the guides and having movement thereon essentially perpendicular to the plane of the platform, each of the blocks with its guides forming a receiver section, an additional receiver section disposed essentially radially in relation to the platform, so that the longitudinal axis of the receiver formed by the said sections extends substantially in the direction of the center of the platform, and means for closing the receiver, as set forth.

22. The combination, with the platform, the essentially vertical guides secured thereto and disposed radially, and supports secured between the guides, of receiver blocks loosely set between the guides and forming receiver sections therewith, said blocks being provided with cavities extending in an essentially radial direction, the blocks having shoulders adapted to rest on the said supports, and being capable of movement perpendicular to the plane of the platform, an additional receiver section to complete the receiver, and means for moving each receiver block toward the said additional receiver section to close the receiver, substantially as described.

23. The combination, with the wrapper conveying device, and the wrapping device provided with jaws to take the wrapper from the wrapper conveying device, of the platform and receiver-block holding guides secured thereto, one of the said guides being lower than the other to permit the wrapper to pass over it into the path of travel of the wrapping jaws, substantially as described.

24. In a cigarette machine, a wrapping device, comprising a reciprocating slide, jaws rotatably mounted on the slide and extending in the direction in which the slide is adapted to move, one of the jaws being movable relatively to the other, means for opening and closing the jaws, means for advancing and retracting the slide, and means for rotating the jaws, substantially as described.

25. In a cigarette machine, a wrapping device, comprising a reciprocating slide, jaws rotatably mounted thereon, one of the jaws being movable relatively to the other, a rod having movement relatively to the slide and an operative connection to open or close the jaws, means for actuating the said rod and the slide, and means for rotating the jaws, substantially as described.

26. In a cigarette machine, a wrapping device, comprising a reciprocating slide, a shaft journaled in the slide, a jaw which is stationary relatively to the shaft, another jaw having movement relatively to the fixed jaw yet held to rotate therewith, a sliding rod operatively connected to the movable jaw, and means for rotating the jaws, substantially as described.

27. The combination, with the shaft of the wrapping device and the jaws held to rotate therewith, one of the jaws being movable relatively to the other, of a rod having sliding movement longitudinally of the shaft and an operative connection to open or close the jaws, means for actuating the said rod, and means for rotating the shaft, substantially as described.

28. The combination of the shaft of the wrapping device, the jaw fixed thereto, another jaw movable toward and from the fixed jaw, a sleeve having longitudinal movement on the shaft and operatively connected to the movable jaw, means whereby the movable jaw is compelled to rotate with the shaft, and means for rotating the shaft, substantially as described.

29. The combination of the shaft of the wrapping device, the jaw fixed thereto, a pin secured to the fixed jaw, another jaw having guided movement on the said pin toward and from the fixed jaw, another pin secured to the movable jaw, and a sliding sleeve provided with inclined slots engaged by the pin of the movable jaw to control the position of the latter, substantially as described.

30. The combination of the shaft of the wrapping device, the vertically-adjustable bearings wherein the said shaft is journaled to permit of giving various inclinations to the shaft, the wrapping jaws held to rotate with the shaft, one of the jaws being movable relatively to the other, means for opening and closing the said jaws, and means for rotating the shaft, substantially as described.

31. The combination of the shaft of the wrapping device, a jaw fixed thereto and provided with a sleeve-like portion, a movable jaw whose end is located within the said sleeve-like portion, a pin extending transversely within the said sleeve portion and secured thereto, said pin being loosely engaged by the movable jaw to permit the same to approach or recede from the fixed jaw, the pin also compelling the movable jaw to rotate with the fixed jaw and holding it against longitudinal displacement relatively thereto, another pin secured to the movable jaw and projecting outwardly through the sleeve-like portion of the fixed jaw, a sleeve having sliding movement on the said portion of the fixed jaw and provided with inclined slots engaged by the pin of the movable jaw, a plate wherein the said sleeve is loosely mounted, and means for moving the said plate longitudinally in relation to the shaft to open or close the jaws, substantially as described.

32. The combination, with the receiver block and guides wherein it is adapted to move, and wherewith it forms a lower receiver section, of two slides having reciprocating movement toward and from each other, one of the slides being adapted for operative engagement with the receiver block to raise the same, while the other slide carries an upper receiver section having guided movement toward and from the lower receiver section, and means for operating the slides to move the block and the upper receiver section toward each other and thus close the receiver, substantially as described.

33. The combination with the receiver block, guides wherein it is adapted to move, and wherewith it forms a lower receiver section, and supports on which the block is adapted to rest, of two slides having reciprocating movement toward and from each other, one of the slides carrying arms adapted to engage the receiver block from below and raise it off its supports, while the other slide carries an upper receiver section having guided movement toward and from the lower receiver section, and means for operating the slides to move the block and the upper receiver section toward each other and thus close the receiver, substantially as described.

34. The combination, with the receiver block forming a part of a receiver section, the guides wherein the said block is adapted to move, and the supports on which it is adapted to rest, of stationary guides, slides constructed to move thereon, a pivoted disk provided with cam slots engaged by projections from the slides, means for operating the disk, arms secured to one of the slides and adapted to engage the receiver block to raise the same, and an additional receiver section secured to the other slide and adapted to move toward and from the first named receiver section, substantially as described.

35. The combination, with the receiver or cigarette support, of a sliding frame provided with points whose path of travel extends adjacent to the ends of the support, another sliding frame having movement in the same direction as the first named frame, and tongues pivoted to one of the frames, and loosely connected with the other frame to receive a pivotal movement when one of the frames moves relatively to the other, said tongues being provided with points to fold the wrapper, substantially as described.

36. The combination, with the cigarette support, of the upper sliding frame provided with points to engage the wrapper ends from above, the lower sliding frame having a loose connection with the said upper frame, and tongues having a pivotal connection with the upper frame and a loose connection with the lower frame so as to receive a swinging movement when the upper frame moves relatively to the lower one, said tongues carrying points adapted to engage the wrapper ends from below, substantially as described.

37. The combination with the cigarette support, of the upper sliding frame provided with points to engage the wrapper ends from above, the lower sliding frame having a loose connection with the said upper frame, and tongues having an adjustable pivotal connection with the upper frame and a pin and slot connection with the lower frame so as to receive a swinging movement when the upper frame moves relatively to the lower one, said tongues carrying points adapted to engage the wrapper ends from below, substantially as described.

38. The combination, with the cigarette support, of the upper sliding frame provided with points to engage the wrapper ends from above, the lower sliding frame having a loose connection with the said upper frame, tongues each having an adjustable pivotal connection with the upper frame and a pin and slot connection with the lower frame so as to receive a swinging movement when the upper frame moves relatively to the lower one, said tongues carrying at their free ends points having an adjustable pivotal connection therewith, and adapted to engage the wrapper ends from below, and means for fastening the points relatively to the tongues after adjustment, substantially as described.

39. The combination, with the cigarette support, of the upper sliding frame provided with points to engage the wrapper ends from above, the lower sliding frame having a loose connection with the said upper frame, tongues each having a transverse slot adapted to be engaged by a fulcrum screw secured to the upper frame, and a longitudinal slot adapted to be engaged by a guide pin secured to the lower frame, so that the tongues will receive a swinging movement when the upper frame moves relatively to the lower one, said tongues carrying points adapted to engage the wrapper ends from below, substantially as described.

40. The combination of the tobacco hopper, the cutter therein, and the delivery roller located adjacent to the outlet of the hopper and rotating toward the same to throw the material back to the cutter, substantially as described.

41. The combination of the tobacco hopper, the rotary cutter therein, and the delivery roller located adjacent to the outlet of the hopper and operatively connected to the cutter to rotate in unison therewith, and throw the material back to the cutter, substantially as described.

42. The combination of the tobacco hopper, the rotary cutter therein, the delivery roller likewise arranged in the hopper, and a driving connection between the said roller and the cutter, whereby they are caused to rotate in the same direction, the roller rotating toward the cutter to throw the material back thereto, substantially as described.

43. The combination of the tobacco hopper, the cutter therein, the roller located at the outlet of the hopper, and means for adjusting the roller relatively to the outlet to regulate the delivery of cut tobacco, substantially as described.

44. The combination of the tobacco hopper, the rotary cutter therein, the frame loosely mounted on the shaft of the cutter, the roller journaled in the said frame and arranged adjacent to the outlet of the hopper, intermeshing gear wheels on the shafts of the roller and the cutter respectively, and means for turning the frame on the cutter shaft to adjust the roller relatively to the outlet, substantially as described.

45. The combination of the tobacco hopper having a downwardly-tapering portion and an enlarged portion below the said tapering portion, a vertically disposed agitator extending longitudinally of the hopper to the lower end of the tapering portion thereof, a rotary cutter located in the narrow portion of the hopper, to receive the material that has passed through the agitator, the shaft of the cutter being disposed horizontally, a shield with which co-operates the rotary cutter, a roller located in the enlarged portion of the hopper near the delivery end thereof, and a driving connection between the cutter and the roller, substantially as described.

46. The combination of the tobacco hopper, the cutter therein, the roller arranged at the outlet of the hopper, the conveyer arranged below the hopper, and means for adjusting the roller relatively to the conveyer, substantially as described.

DOMINGO PEREZ Y BUÑOL.

Witnesses:
C. SEDGWICK,
JOHN LOTKA.